US011073420B2

(12) United States Patent
Lavine (10) Patent No.: US 11,073,420 B2
(45) Date of Patent: Jul. 27, 2021

(54) ACTIVE PARTIAL-BEAM ALIGNMENT SYSTEMS FOR SENSOR-TO-LASER BORESIGHT MAINTENANCE

(71) Applicant: Raytheon Company, Waltham, MA (US)

(72) Inventor: Jason R. Lavine, McKinney, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/181,686

(22) Filed: Nov. 6, 2018

(65) Prior Publication Data

US 2020/0141795 A1   May 7, 2020

(51) Int. Cl.
| | | |
|---|---|---|
| *G01J 1/02* | (2006.01) | |
| *G01J 1/42* | (2006.01) | |
| *G01J 1/04* | (2006.01) | |
| *G02B 27/14* | (2006.01) | |
| *H04N 5/225* | (2006.01) | |
| *G02B 5/122* | (2006.01) | |

(52) U.S. Cl.
CPC ........... *G01J 1/0238* (2013.01); *G01J 1/0403* (2013.01); *G01J 1/0414* (2013.01); *G01J 1/4257* (2013.01); *G02B 5/122* (2013.01); *G02B 27/14* (2013.01); *H04N 5/2254* (2013.01); *H04N 2005/2255* (2013.01)

(58) Field of Classification Search
CPC .... G02B 23/06; G02B 17/0884; G02B 23/16; G02B 26/06; G02B 26/0825; G02B 5/32; G02B 23/08; G02B 26/108; G02B 27/14; G02B 5/122; G02B 7/182; H01S 3/005; H01J 37/3405; H01J 37/3435; G01J 1/0238; G01J 1/0403; G01J 1/0414; G01J 1/4257; H04N 2005/2255; H04N 5/2254; B23K 26/032; B23K 26/04

See application file for complete search history.

(56) References Cited

U.S. PATENT DOCUMENTS

| | | |
|---|---|---|
| 3,885,162 A | 5/1975 | Geertz |
| 7,236,299 B1 | 6/2007 | Smith |
| 2003/0081293 A1* | 5/2003 | Wood, Jr. ........... H04B 10/1121 398/126 |
| 2003/0174315 A1 | 9/2003 | Byren et al. |

(Continued)

OTHER PUBLICATIONS

Eartly et al., "COPS Position Monitoring System for the CMS Endcap Muon Detector," The Compact Muon Solenoid Experiment, CMS Note, Dec. 1996, 20 pages.

(Continued)

*Primary Examiner* — Deoram Persaud (57) ABSTRACT

An apparatus includes a reflector having one or more reflective faces and an opening. The reflector is selectively movable into and out of an optical path of an alignment beam. When the reflector is located within the optical path of the alignment beam, (i) the one or more reflective faces are configured to reflect a first portion of the alignment beam and (ii) the opening is configured to allow passage of a second portion of the alignment beam through the reflector. The reflector may include a retro-reflector, the retro-reflector may include multiple reflective faces, and the multiple reflective faces may be positioned around the opening.

21 Claims, 4 Drawing Sheets

(56) References Cited

U.S. PATENT DOCUMENTS

| | | | |
|---|---|---|---|
| 2004/0013351 A1* | 1/2004 | Zhao | G02B 6/32 |
| | | | 385/22 |
| 2005/0024649 A1* | 2/2005 | Tsai | G01B 21/042 |
| | | | 356/614 |
| 2007/0016386 A1* | 1/2007 | Husted | G01C 17/00 |
| | | | 702/150 |
| 2008/0042042 A1 | 2/2008 | King et al. | |
| 2010/0282942 A1 | 11/2010 | Mosier et al. | |
| 2014/0060177 A1* | 3/2014 | Kline | G01F 23/2962 |
| | | | 73/290 V |
| 2014/0240831 A1* | 8/2014 | Chann | G02B 27/1006 |
| | | | 359/489.08 |
| 2016/0003608 A1* | 1/2016 | Lenz | G01B 11/272 |
| | | | 356/622 |

OTHER PUBLICATIONS

Hintz et al., "UAV Infrared Search and Track (IRST)/Eyesafe Laser Range Finder (ELR) System," NATO OTAN Unclassified/Unlimited, RTO-MP-SET-094, 2005, 14 pages.

Moromisato et al., "Study of Position Resolution with COPS," Nuclear Instruments and Methods in Physics Research, Section A: Accelerators, Spectrometers, Detectors and Associated Equipment, vol. 426, Issues 2-3, May 1998, 20 pages.

International Search Report and Written Opinion of the International Searching Authority in connection with International Patent Application No. PCT/US2019/039175 dated Aug. 17, 2020, 17 pages.

Wikipedia, "Head mirror," Sep. 28, 2018, 2 pages.

\* cited by examiner

ACTIVE PARTIAL-BEAM ALIGNMENT SYSTEMS FOR SENSOR-TO-LASER BORESIGHT MAINTENANCE

TECHNICAL FIELD

This disclosure generally relates to laser systems. More specifically, this disclosure relates to active partial-beam alignment systems for sensor-to-laser boresight maintenance.

BACKGROUND

High-energy laser (HEL) systems are being developed for a number of commercial and defense-related applications. In order to aim a high-energy laser beam, the high-energy beam and a low-power alignment beam can follow a common optical path in some laser systems. At some point, the alignment beam is redirected to a sensor, where the sensor is used to capture images of a target or target area as well as the alignment beam. The alignment beam is therefore used to generate a "see-spot" within the images of the target or target area. The see-spot helps to identify the likely location that the high-energy beam would strike when the laser system is fired.

Other approaches for aiming a high-energy laser beam use a camera to view where the high-energy beam actually strikes so that the high-energy beam can be redirected as needed. However, these approaches require firing of the high-energy laser to view where the high-energy beam strikes, and these approaches cannot be used in systems that shield their cameras from the wavelength(s) of their high-energy beams. Still other approaches utilize an external reflector to help determine if a high-energy beam is properly aligned with an aiming system. However, these approaches can cause an overall system to lose fine tracking of a target or target area when a beam is temporarily redirected to the external reflector.

SUMMARY

This disclosure provides active partial-beam alignment systems for sensor-to-laser boresight maintenance.

In a first embodiment, an apparatus includes a reflector having one or more reflective faces and an opening. The reflector is selectively movable into and out of an optical path of an alignment beam. When the reflector is located within the optical path of the alignment beam, (i) the one or more reflective faces are configured to reflect a first portion of the alignment beam and (ii) the opening is configured to allow passage of a second portion of the alignment beam through the reflector.

In a second embodiment, a system includes a first sensor configured to capture measurements associated with a scene and a second sensor configured to capture measurements associated with an alignment beam. The system also includes an assembly that includes a reflector. The reflector includes one or more reflective faces and an opening. The reflector is selectively movable into and out of an optical path of the alignment beam. When the reflector is located out of the optical path of the alignment beam, the second sensor is configured to receive the alignment beam. When the reflector is located within the optical path of the alignment beam, (i) the one or more reflective faces are configured to reflect a first portion of the alignment beam towards the first sensor and (ii) the opening is configured to allow passage of a second portion of the alignment beam through the reflector towards the second sensor.

In a third embodiment, a method includes operating a laser system in a first mode of operation in which a reflector is selectively moved out of an optical path of an alignment beam, where the reflector includes one or more reflective faces and an opening. The method also includes, in the first mode of operation, (i) using a first sensor to capture measurements associated with a scene and (ii) using a second sensor to capture measurements associated with the alignment beam. The method further includes operating the laser system in a second mode of operation in which the reflector is selectively moved into the optical path of the alignment beam. In addition, the method includes, in the second mode of operation, (i) using the one or more reflective faces to reflect a first portion of the alignment beam towards the first sensor and (ii) allowing passage of a second portion of the alignment beam through the opening of the reflector towards the second sensor.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

FIGS. 1 through 4, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, in some laser systems, a high-energy beam and a low-power alignment beam can follow a common optical path. At some point, the alignment beam is redirected to a sensor, which allows a "see-spot" to be generated within images of a target or target area using the alignment beam. The see-spot can be used to identify the likely location that the high-energy beam would strike when the laser system is fired. However, thermal differences between different components of the laser system when in use can cause errors to appear in the position of the alignment beam, essentially causing errors in the determined location of the see-spot. As a result, the actual strike point for a high-energy beam can diverge from the determined see-spot. This can interfere with operation of the laser system, even with proper calibration of the laser system ahead of time. Other approaches, such as cameras that view where high-energy beams actually strike or external reflectors, suffer from other shortcomings.

This disclosure provides mechanisms for active partial-beam alignment to support sensor-to-laser boresight maintenance. In addition to allowing a visible see-spot to be generated within images of a scene, these mechanisms allow an internal see-spot to be generated within a laser system. This is accomplished utilizing a retro-reflector that can be selectively switched into and out of an optical path of an alignment beam. During operation, one or more images of a scene (which can include a target or target area) can be generated by a first focal plane array or other sensor. When the retro-reflector is switched out of the optical path of the alignment beam, a second focal plane array or other sensor receives the alignment beam. The location of a visible see-spot within the image or images can be determined using the second sensor, and the visible see-spot can be superimposed over the image or images in the determined location. When the retro-reflector is switched into the optical path of the alignment beam, the retro-reflector reflects a first portion of the alignment beam towards the first sensor, and a passage or other opening in the retro-reflector allows a second portion of the alignment beam to pass through the retro-reflector and be received at the second sensor. Both sensors can capture one or more images or other measurements of their respective portions of the alignment beam. In some instances, the retro-reflector can be physically positioned between the sensors so that the first portion of the alignment beam is reflected directly towards the first sensor, although this may not be required.

In this arrangement, when the retro-reflector is switched into the optical path of the alignment beam, both the first and second sensors can capture images or other measurements associated with the same alignment beam. The measurements can be processed in any suitable manner to detect if there are any differences between the locations of the alignment beam as sensed by the first and second sensors. For example, centroids of the received portions of the alignment beam can be calculated, and a difference between the calculated centroids (if any) can be determined in order to detect when the positions of the alignment beam on the sensors do not match. This can occur once or multiple times while the retro-reflector is located in the optical path of the alignment beam. If there is misalignment in the sensed locations of the alignment beam, one or more corrective actions can occur, such as modifying the position of the visible see-spot presented to an operator or altering a fast steering mirror or other structure to compensate for the misalignment.

In this way, an alignment beam can be provided to one sensor during normal operation, and portions of the same alignment beam can be selectively provided to multiple sensors when needed. Thus, it can be determined whether the sensors are sensing the alignment beam in the same location or in different locations. Effectively, this provides an internal see-spot between the sensors, allowing corrections to be made for thermal differences or other issues experienced by the laser system that might cause errors when aiming a high-energy beam. This is in addition to the visible see-spot that can be created within images of a scene. The active partial-beam alignment mechanisms described below can therefore be used to support functions such as boresight checks or boresight alignments in laser systems. Also, depending on the implementation, the internal see-spot can be generated prior to, during, or after laser firing (or during any combination thereof). In addition, the active partial-beam alignment mechanisms described below can be used while the laser system is performing fine tracking of a target or target area, allowing boresight checks or boresight alignments even during fine tracking operations.

Figure 1:
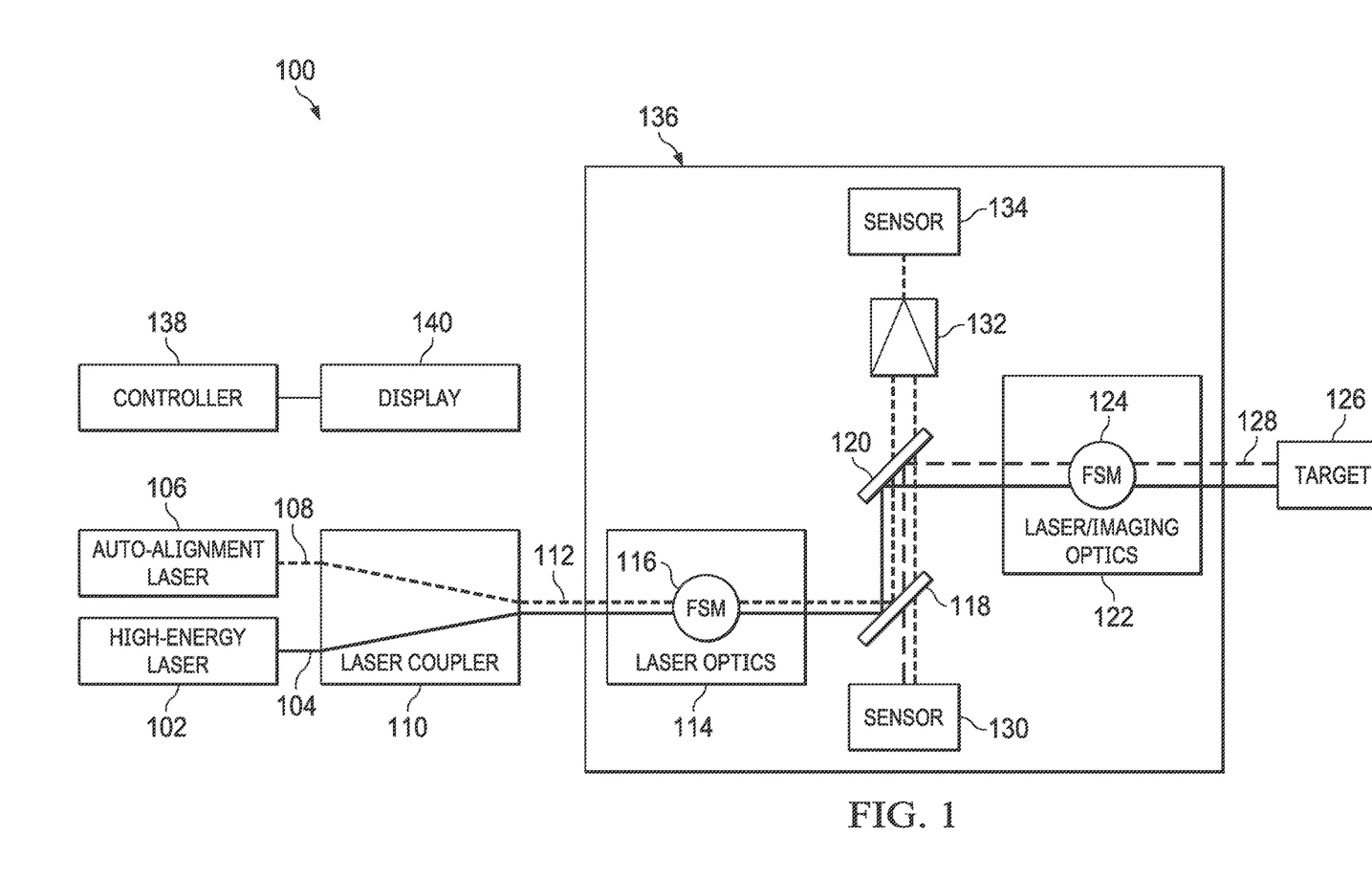
FIG. 1 illustrates an example system using active partial-beam alignment for sensor-to-laser boresight maintenance in accordance with this disclosure.

FIG. 1 illustrates an example system 100 using active partial-beam alignment for sensor-to-laser boresight maintenance in accordance with this disclosure. As shown in FIG. 1, the system 100 includes a high-energy laser 102, which generally operates to produce at least one high-energy laser beam 104. The laser 102 represents any suitable source configured to generate at least one high-energy beam 104. In some embodiments, for example, the laser 102 can be implemented as described in U.S. Patent Application Publication Nos. 2017/0353005 and 2018/0013256 (both of which are hereby incorporated by reference in their entirety). However, any other suitable high-energy laser 102 (now known or later developed) can be used in the system 100. The beam 104 represents any suitable high-energy laser beam having any suitable cross-sectional size and power level. In general, a "high-energy" beam can represent a beam having about 10 kW of power or more.

The high-energy laser 102 can be used in a number of commercial and defense-related applications. For example, the high-energy laser 102 can find use in commercial mining applications, such as in drilling, mining, or coring operations. For instance, the high-energy laser 102 can be used to soften or weaken an earth bed prior to drilling through the earth bed using drill bits. This can allow for fewer drill bit changes and extended lifetimes and reliabilities of the drill bits. Here, free-space propagation of the high-energy laser beam 104 from an output window of the laser 102 may be used, allowing deeper penetration at further distances compared to conventional fiber lasers.

The high-energy laser 102 can also find use in remote laser welding, cutting, drilling, or heat treating operations, such as in industrial or other automation settings. The use of a high-power and high-beam quality system 100 allows the processing of thicker materials to occur at larger working distances from the system 100 while minimizing the heat-affected zone and maintaining vertical or other cut lines. Among other things, this helps to support welding or cutting operations where proximity to the weld or cut site is difficult or hazardous. It also helps to protect the system 100 and possibly any human operators from smoke, debris, or other harmful materials.

The high-energy laser 102 can further find use in construction and demolition operations. Example operations can include metal resurfacing or deslagging, paint removal, and industrial demolition operations. The high-energy laser 102 can be used to ablate material much faster and safer compared to conventional operations. As a particular example of this functionality, the high-energy laser 102 can be used to support demolition of nuclear reactors or other hazardous structures. Here, the high-energy laser 102 can be used to cut through contaminated structures like contaminated concrete or nuclear containment vessels or reactors from long distances. This helps to avoid the use of water jet cutting or other techniques that create hazardous waste, such as contaminated water. It also provides improved safety since human operators can remain farther away from contaminated structures being demolished.

A number of additional applications are possible. For example, the high-energy laser 102 can find use in power beaming applications, where high-power laser beams 104 are targeted to photovoltaic (solar) cells of remote devices to be recharged. The high-energy laser 102 can also find use in hazardous material (HAZMAT) applications, where the laser 102 is used to heat and decompose hazardous materials into less harmful or non-harmful materials. Note that all of the above applications are for illustration only and do not limit this disclosure to any particular applications of the system 100.

The system 100 also includes an auto-alignment laser 106, which generally operates to produce at least one alignment beam 108. As described in more detail below, the alignment beam 108 follows a common optical path as the high-energy beam 104, until the alignment beam 108 is separated from the high-energy beam 104 and is used to calculate the location of a visible see-spot to be presented to one or more operators or other personnel. The laser 106 represents any suitable source configured to generate at least one alignment beam 108. The beam 108 represents any suitable low-energy laser beam having any suitable cross-sectional size and power level. In general, a "low-energy" alignment beam can represent a beam having an energy/power level that is significantly smaller than the energy/power level of the high-energy beam 104. In some embodiments, the alignment beam 108 can represent a beam of about 50 mW of power or less.

The beams 104 and 108 are provided to a laser coupler 110, which couples the beams 104 and 108 onto a common optical pathway 112. The system 100 therefore represents a "common path" laser system since the beams 104 and 108 travel at least partially through the system 100 along the common optical pathway 112. The laser coupler 110 includes any suitable structure for receiving multiple laser beams and outputting the beams along a common optical pathway 112.

Laser optics 114 are used to direct the beams 104 and 108 in a desired direction towards other components of the system 100. The laser optics 114 can include at least one first fast steering mirror (FSM) 116. The first fast steering mirror 116 typically represents a mirror mounted on a multi-axis mount that can be controlled to help compensate for vibrations or other forces acting on the system 100. The laser optics 114 generally represent any suitable optical device or devices configured to provide multiple beams to a desired location within the laser system 100. The first fast steering mirror 116 includes any suitable controllable mirror used to compensate for vibrations or other forces.

The laser optics 114 direct the beams 104 and 108 to a first beam splitter 118. The first beam splitter 118 is highly reflective at the wavelength(s) of the high-energy beam 104 and reflects the beam 104 towards a second beam splitter 120. The second beam splitter 120 is also highly reflective at the wavelength(s) of the high-energy beam 104 and reflects the beam 104 towards laser/imaging optics 122. The laser/imaging optics 122 are used to direct the beam 104 in a desired direction towards a target 126. The laser/imaging optics 122 can include at least one second fast steering mirror 124, which again can include a mirror mounted on a multi-axis mount that can be controlled to help compensate for vibrations or other forces acting on the system 100. The laser/imaging optics 122 generally represent any suitable optical device or devices configured to direct at least one laser beam in a desired direction. The second fast steering mirror 124 includes any suitable controllable mirror used to compensate for vibrations or other forces.

The target 126 generally represents an object or area at which the high-energy beam 104 is being aimed. As noted above, there are various commercial and defense-related applications in which the system 100 can be used, so various types of targets 126 can exist depending on the application. As shown in FIG. 1, a signal 128 associated with the target 126 is directed towards or otherwise received at the system 100. For example, the signal 128 can represent visible radiation, near-infrared (NIR) radiation, and/or short-wave infrared (SWIR) radiation. Near-infrared radiation can be defined as radiation between 0.7 µm and 1.4 µm in wavelength, and short-wave infrared radiation can be defined as radiation between 1.4 µm and 3.0 µm in wavelength. However, different schemes classify infrared radiation using different wavelength ranges, and this disclosure is not limited to use with any specific classification scheme for infrared radiation. In some embodiments, the signal 128 can be emitted by the target 126 itself or by objects or area within or around the target 126.

The signal 128 is directed by the laser/imaging optics 122 to the second beam splitter 120. The second beam splitter 120 is highly reflective at the wavelength(s) of the signal 128 and reflects the signal 128 towards the first beam splitter 118. The first beam splitter 118 is highly transmissive at the wavelength(s) of the signal 128, allowing the signal 128 to pass through the first beam splitter 118 to a first sensor 130.

The first sensor 130 senses/measures the signal 128 received from the target 126 or the objects or area within or around the target 126. The measurements captured by the first sensor 130 can be used for various functions, such as to generate still or video images of the target 126 and the surrounding area. The still or video images can be generated by the first sensor 130 or by another component using data output by the first sensor 130. The still or video images can then, for example, be provided to an operator to facilitate aiming of the high-energy beam 104. The first sensor 130 includes any suitable sensor for receiving and measuring a signal 128 associated with a target 126, such as an NIR and SWIR sensor. In particular embodiments, the first sensor 130 includes a focal plane array having an array of sensor or detector elements. The first sensor 130 can also incorporate or support any number of additional features, such as target acquisition and target tracking functions.

As can be seen in FIG. 1, part of the first beam splitter 118 is highly reflective at the wavelength(s) of the alignment beam 108 and reflects the alignment beam 108 towards the second beam splitter 120. The second beam splitter 120 is highly transmissive at the wavelength(s) of the alignment beam 108, allowing the alignment beam 108 to pass through the second beam splitter 120 towards a switchable retro-reflector assembly 132 and a second sensor 134.

The switchable retro-reflector assembly 132 represents a structure that can selectively insert a retro-reflector into the optical path of the alignment beam 108. As described in more detail below, when the switchable retro-reflector assembly 132 moves the retro-reflector out of the optical path of the alignment beam 108, the second sensor 134 can receive the alignment beam 108. When the switchable retro-reflector assembly 132 moves the retro-reflector into the optical path of the alignment beam 108, the retro-reflector reflects a first portion of the alignment beam 108 towards the first sensor 130, and the second sensor 134 can receive a second portion of the alignment beam 108 through a passage or other opening in the retro-reflector. The switchable retro-reflector assembly 132 includes any suitable structure configured to move a retro-reflector into and out of an alignment beam's optical path.

The second sensor 134 senses/measures at least part of the alignment beam 108. The measurements captured by the second sensor 134 can be used to predict where the high-energy beam 104 is being aimed. For example, the second sensor 134 can capture images or other measurements associated with the alignment beam 108, and those measurements can be used to identify the centroid of the alignment beam 108 on the second sensor 134 (where the centroid is used as the aim point for the high-energy beam 104). Of course, other analyses can occur in order to identify an aim point for the high-energy beam 104 based on measurements captured by the second sensor 134. The second sensor 134 includes any suitable sensor for receiving and measuring at least part of an alignment beam 108, such as a Coude Optical Position Sensor (COPS) or other position sensitive detector (PSD). In some embodiments, the second sensor 134 can generate outputs at a high data rate (such as about 3 kHz or more) in order to facilitate detection of potential misalignment in the sensed locations of the alignment beam 108 described in more detail below.

During normal operation, the switchable retro-reflector assembly 132 moves the retro-reflector out of the optical path of the alignment beam 108, and the second sensor 134 receives the bulk or all of the alignment beam 108. The estimated location of the alignment beam 108 as sensed using the second sensor 134 can be used in various ways, such as to generate a visible see-spot that is superimposed onto one or more images of the target 126 that are generated using the first sensor 130. This allows an operator to see where the system 100 is aimed and, if necessary, adjust the aim of the system 100. Ideally, this allows the high-energy laser 102 to be accurately aimed without requiring a laser or other signal to first be transmitted towards the target 126.

During boresight checks, boresight alignments, or other operations involving checking or changing the boresight of the system 100 (generally referred to as boresight maintenance), the switchable retro-reflector assembly 132 moves the retro-reflector into the optical path of the alignment beam 108. In that position, the switchable retro-reflector assembly 132 reflects a first portion of the alignment beam 108 towards the first sensor 130, allowing the first sensor 130 to be used to detect the position of the alignment beam 108. The second sensor 134 can also receive a second portion of the alignment beam 108 passing through an opening of the retro-reflector, which allows the second sensor 134 to also detect the position of the alignment beam 108. Processing of the measurements from both sensors 130 and 134 can then occur, such as by identifying the centroids or centroid tracks of the portions of the alignment beam 108 on the sensors 130 and 134. If a discrepancy is detected in the positions of the portions of the alignment beam 108 on the sensors 130 and 134, suitable corrective action can then occur. Effectively, this allows the generation of an internal see-spot that can be used to detect when the sensors 130 and 134 are identifying different positions of the alignment beam 108.

To support this functionality, the first beam splitter 118 can be highly reflective at the wavelength(s) of the alignment beam 108 in some areas and highly transmissive at the wavelength(s) of the alignment beam 108 in other areas. This allows the alignment beam 108 to reflect from the first beam splitter 118 towards to the second sensor 134 while allowing the first portion of the alignment beam 108 reflected from the switchable retro-reflector assembly 132 to pass through the first beam splitter 118 towards the first sensor 130.

In some embodiments, various components of the system 100 can be included within a turret 136. The turret 136 generally represents any suitable structure configured to rotate or otherwise reposition components of the system 100 in order to alter the direction in which the high-energy beam 104 is roughly aimed. For example, the turret 136 can represent a multi-axis gimbal that is mountable to a ground, flight, marine, or space vehicle. In this particular example, the lasers 102 and 106 and the laser coupler 110 are located outside the turret 136, although this need not be the case.

As shown in FIG. 1, the system 100 also includes at least one controller 138 and at least one display 140. The controller 138 can be used to perform various functions in the system 100. For example, in some embodiments, the controller 138 can present images generated using data collected by the first sensor 130, such as still or video images of the target 126. As noted above, the first sensor 130 can generate the images, or the controller 138 can generate the images using outputs from the first sensor 130. The controller 138 can also superimpose a visible see-spot onto the still or video images based on the location of the alignment beam 108 as sensed by or as determined using measurements from the second sensor 134. The controller 138 can further control the operation of the lasers 102 and 106 and the fast steering mirrors 116 and 124, such as to control the generation of the beams 104 and 108 or to control the aiming or direction of the beams 104 and 108.

In addition, the controller 138 can perform calculations, take corrective action, or perform other functions related to boresight maintenance. For example, in some embodiments, the controller 138 can sense an operator initiating a boresight maintenance operation, or the controller 138 can itself initiate the boresight maintenance operation. In either case, the controller 138 can cause the switchable retro-reflector assembly 132 to move the retro-reflector into the optical path of the alignment beam 108. The controller 138 can also receive sensed locations of the portions of the alignment beam 108 from the sensors 130 and 134, or the controller 138 can identify the locations of the portions of the alignment beam 108 on the sensors 130 and 134 based on measurements from the sensors 130 and 134. The controller 138 can further identify any differences between the sensed locations of the portions of the alignment beam 108 on the sensors 130 and 134, such as by identifying any differences in the centroids or centroid tracks of the portions of the alignment beam 108. If discrepancies are detected, the controller 138 can take corrective action. One example corrective action involves updating the location of the visible see-spot in the images presented to one or more operators. Another example corrective action involves adjusting one or more of the fast steering mirrors 116 and 124 so that the alignment beam 108 is sensed at the same location by both sensors 130 and 134.

The controller 138 includes any suitable structure for controlling one or more operations of the system 100. For example, in some embodiments, the controller 138 can represent a computer or processing system having one or more processing devices, such as at least one microprocessor, microcontroller, digital signal processor (DSP), application specific integrated circuit (ASIC), field programmable gate array (FPGA), or discrete circuitry. If needed or desired, the controller 138 can also include at least one memory, such as a memory used to store instructions or data used, generated, or collected by the controller 138. Example types of memory include a random access memory, a read only memory, a hard drive, a Flash memory, an optical disc, or any other suitable volatile or non-volatile storage device(s). The controller 138 may further include at least one interface configured to communicate with one or more external devices or systems, such as the lasers 102 and 106, fast steering mirrors 116 and 124, or sensors 130 and 134 (or any combination thereof). Example types of interfaces include serial or parallel electrical interfaces, optical interfaces, wired network interfaces like Ethernet interfaces, and wireless network interfaces like WiFi or other radio frequency (RF) interfaces.

The display 140 can be used to present various information to one or more operators. For example, the display 140 can be used to present still or video images of the target 126 that are generated or based on measurements captured by the first sensor 130. The display 140 can also be used to present a visible see-spot over the still or video images, where the location of the visible see-spot is determined or based on measurements captured by the second sensor 134. The display 140 can further be used to present information related to boresight maintenance to one or more operators. For instance, the display 140 can be used to present an option for initiating boresight maintenance and, once initiated, display the results of the boresight maintenance. The display 140 can also be used to present options for initiating corrective action to correct misalignment in the sensed locations of the alignment beam 108. The display 140 represents any suitable device configured to present information to one or more users and optionally receive input from one or more users, such as a liquid crystal display (LCD), light emitting diode (LED) display, or touchscreen.

When the system 100 is manufactured, a factory calibration can occur to align the sensed locations of the alignment beam 108 by the sensors 130 and 134. However, as noted above, thermal differences between different components of the system 100 when in use or other problems can cause misalignment in the sensed locations of the alignment beam 108. This can occur even when the factory calibration was performed successfully and when field calibrations are performed in the field to align the sensed locations of the alignment beam 108 before use. Thus, the system 100 here supports the use of the switchable retro-reflector assembly 132 and the ability to selectively create an internal see-spot between the sensors 130 and 134. As a result, the alignment beam 108 can be provided to one sensor (second sensor 134) during normal operation, and portions of the same alignment beam 108 can be selectively provided to multiple sensors (sensors 130 and 134) to support boresight maintenance. This allows corrections to be made for thermal differences or other issues experienced by the system 100 that might cause errors when aiming the high-energy beam 104 (whether the system 100 is being calibrated in the factory, calibrated in the field prior to or after use, or calibrated in the field during use). Moreover, this functionality can be used while the system 100 is performing fine tracking of a target 126.

Although FIG. 1 illustrates one example of a system 100 using active partial-beam alignment for sensor-to-laser boresight maintenance, various changes may be made to FIG. 1. For example, the arrangement of various optics (such as mirrors and beam splitters) and other devices in FIG. 1 is for illustration only. Laser systems can often be configured in various ways to route beams and other signals as needed, and FIG. 1 does not limit the scope of this disclosure to any particular physical configuration. Also, the laser system 100 in FIG. 1 represents one example of the type of system where a switchable retro-reflector can be used. However, the switchable retro-reflector can be used in any other suitable laser system.

Figure 2:
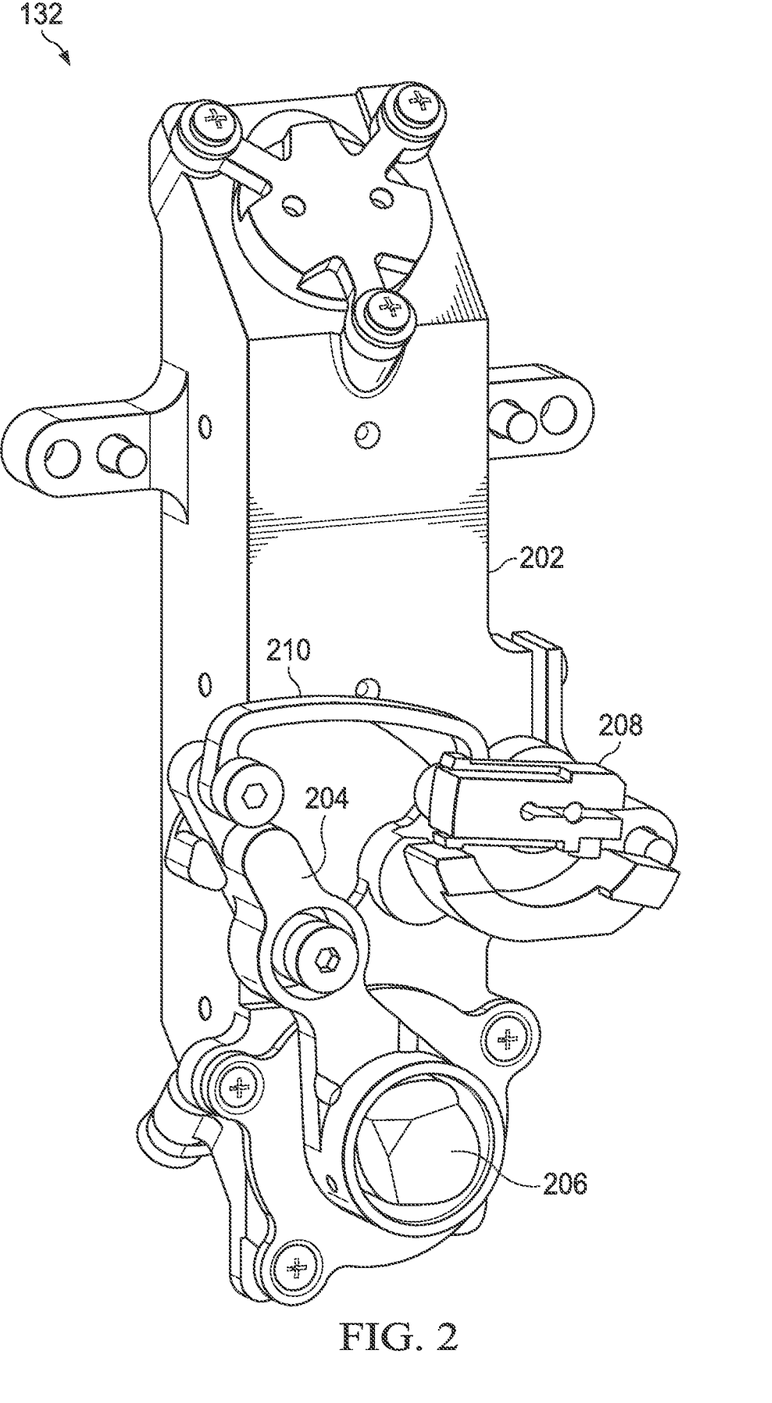
FIG. 2 illustrates an example switchable retro-reflector for use in active partial-beam alignment for sensor-to-laser boresight maintenance in accordance with this disclosure.

FIG. 2 illustrates an example switchable retro-reflector assembly 132 for use in active partial-beam alignment for sensor-to-laser boresight maintenance in accordance with this disclosure. For ease of explanation, the switchable retro-reflector assembly 132 shown in FIG. 2 is described as being used in the system 100 shown in FIG. 1. However, the switchable retro-reflector assembly 132 can be used in any other suitable system.

As shown in FIG. 2, the switchable retro-reflector assembly 132 includes a housing 202, which generally carries other components of the switchable retro-reflector assembly 132. The housing 202 can also be mounted to a support structure or other structure. The housing 202 in this example has a specific shape and includes a specific mechanism for coupling to a support structure or other structure (namely two flanges each with an alignment pin and a hole). However, the housing 202 can have any suitable size, shape, and dimensions, and the housing 202 can be coupled to a support structure or other structure in any suitable manner. Also, the housing 202 can be formed from any suitable material or materials, such as metal. In addition, the housing 202 can be formed in any suitable manner.

In this example, a lower portion of the housing 202 defines an opening or aperture through which the alignment beam 108 can pass through the housing to reach the second sensor 134. A movable arm 204 is pivotally coupled to the housing 202 in order to selectively position a retro-reflector 206 in front of or away from the aperture. For example, rotating the movable arm 204 clockwise in FIG. 2 can move the retro-reflector 206 away from the aperture in the housing 202. This allows all or substantially all of the alignment beam 108 to pass through the aperture in the housing 202 and reach the second sensor 134. Rotating the movable arm 204 counter-clockwise in FIG. 2 can move the retro-reflector 206 in front of the aperture in the housing 202. This allows the retro-reflector 206 to reflect a first portion of the alignment beam 108 towards the first sensor 130, while an opening in the retro-reflector 206 allows a second portion of the alignment beam 108 to pass through the aperture in the housing 202 and reach the second sensor 134.

The movable arm 204 includes any suitable structure configured to be moved in order to selectively position a retro-reflector 206. The movable arm 204 can have any suitable size, shape, and dimensions. The movable arm 204 can also be formed from any suitable material or materials, such as metal. In addition, the movable arm 204 can be formed in any suitable manner. The retro-reflector 206 generally includes any suitable structure that can reflect a portion of an alignment beam 108 while allowing another portion of the alignment beam 108 to pass. Various types of retro-reflectors are known in the art, and any of these retro-reflectors can be used in the switchable retro-reflector assembly 132 (and modified as needed to allow a portion of the alignment beam 108 to pass through the retro-reflector 206).

In this example, the retro-reflector 206 is located at a first end of the movable arm 204, and an actuator 208 is coupled to a second end of the movable arm 204 by a linkage 210. The actuator 208 can be mounted to the housing 202 in order to secure the actuator 208 in place. The actuator 208 can be triggered to push or pull on the second end of the movable arm 204 via the linkage 210. For example, pulling on the second end of the movable arm 204 can cause the movable arm 204 to rotate clockwise in FIG. 2, and pushing on the second end of the movable arm 204 can cause the movable arm 204 to rotate counter-clockwise in FIG. 2. The actuator 208 can therefore be used to cause automated movement of the movable arm 204 and the retro-reflector 206. Note, however, that manual movement of the movable arm 204 and the retro-reflector 206 can also or alternatively be supported.

The actuator 208 includes any suitable structure configured to impart movement to a retro-reflector 206. In some embodiments, the actuator 208 represents a linear actuator, where linear motion of an actuator member causes rotation of the movable arm 204 via its connection through the linkage 210. However, any other suitable type of actuator 208 can be used here, such as a rotary actuator. In some embodiments, the actuator 208 can be controlled by the controller 138 based on the operating mode of the system 100, where the actuator 208 moves the retro-reflector 206 out of the optical path of the alignment beam 108 in one mode and into the optical path of the alignment beam 108 in another mode. The linkage 210 represents any suitable structure coupling a movable arm 204 and an actuator 208. However, the use of the linkage 210 is not required, such as when the actuator 208 is coupled directly to the movable arm 204.

As described above, the switchable retro-reflector assembly 132 supports the ability to selectively switch the retro-reflector 206 into and out of the optical path of the alignment beam 108. This allows the retro-reflector 206 to be removed from the optical path of the alignment beam 108 when desired, allowing most or all of the alignment beam 108 to be provided to the second sensor 134 (such as during normal operation of the system 100). As a result, the second sensor 134 can be used to identify the location of the alignment beam 108 within a scene, and a visible see-spot can be formed in one or more images of the scene at the identified location. During boresight maintenance, the retro-reflector 206 can be inserted into the optical path of the alignment beam 108, allowing different portions of the alignment beam 108 to be provided to multiple sensors 130 and 134. As a result, both sensors 130 and 134 can be used to identify the locations of the alignment beam 108 within the scene, and those locations can be compared to determine whether there is any misalignment in the sensed locations of the alignment beam 108. If so, corrective action can then occur, which allows improvement in the aiming capabilities of the system 100.

Although FIG. 2 illustrates one example of a switchable retro-reflector assembly 132 for use in active partial-beam alignment for sensor-to-laser boresight maintenance, various changes may be made to FIG. 2. For example, in other embodiments, the retro-reflector 206 can be moved linearly or in any other suitable manner (rather than being rotated) to selectively position the retro-reflector 206. In general, any suitable mechanism that moves the retro-reflector 206 into and out of the optical path of an alignment beam 108 can be used here.

Figure 3A:
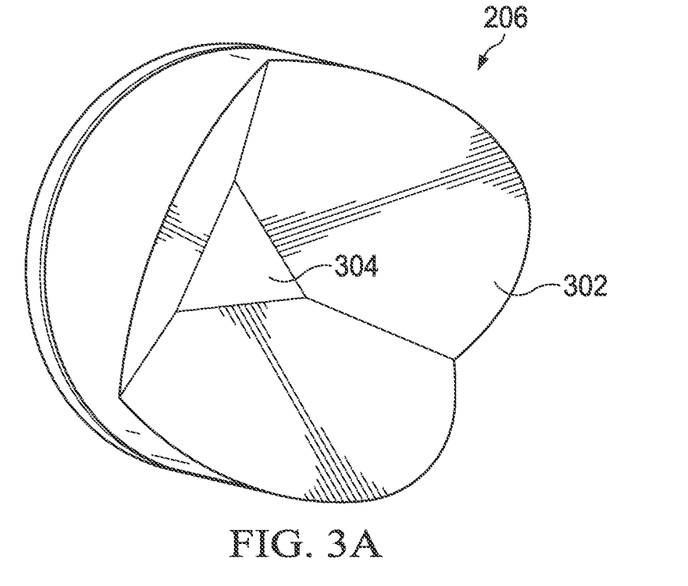
FIGS. 3A and 3B illustrate an example retro-reflector for use in an active partial-beam alignment system in accordance with this disclosure.
Figure 3B:
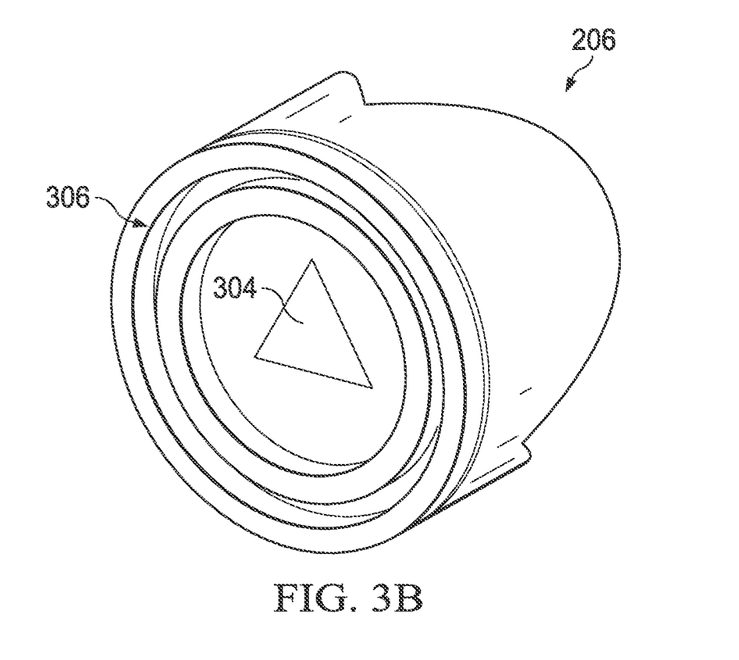

FIGS. 3A and 3B illustrate an example retro-reflector 206 for use in an active partial-beam alignment system in accordance with this disclosure. For ease of explanation, the retro-reflector 206 shown in FIGS. 3A and 3B is described as being used in the switchable retro-reflector assembly 132 shown in FIG. 2 within the system 100 shown in FIG. 1. However, the retro-reflector 206 can be used in any other suitable switchable retro-reflector and in any other suitable system.

As shown in FIG. 3A, the retro-reflector 206 includes multiple reflective faces 302 positioned around an opening 304. The reflective faces 302 collectively operate to receive a first portion of the alignment beam 108 and to reflect the first portion of the alignment beam 108 (typically in the opposite direction). As described above with respect to FIG. 1, the first portion of the alignment beam 108 can be reflected back towards the first and second beam splitters 118 and 120 before being received by the first sensor 130. In this particular example, there are three reflective faces 302 that are mutually perpendicular (like the corner of a cube). As noted above, however, various types of retro-reflectors exist and can be modified to allow reflection of part of an alignment beam 108 and passage of another part of the same alignment beam 108.

As shown in FIGS. 3A and 3B, the opening 304 extends through the retro-reflector 206 and allows the second part of the alignment beam 108 to pass through the retro-reflector 206 towards the second sensor 134 when the retro-reflector 206 is positioned in the optical path of the alignment beam 108. In this example, the opening 304 is triangular, which may allow for easy calculation of the centroid or center of the second portion of the alignment beam 108 received at the second sensor 134. However, the opening 304 can have any suitable shape, including any regular or irregular shape that allows a center or other location of the alignment beam 108 to be determined.

As shown in FIG. 3B, the rear of the retro-reflector 206 in this example includes a recess 306 that extends around the opening 304. The recess 306 may be configured to receive a raised rim within an opening of the movable arm 204 in order to attach the retro-reflector 206 to the movable arm 204. Note, however, that any other suitable mechanism can be used to permanently or temporarily attach the retro-reflector 206 to the movable arm 204.

Note that, in this example, the retro-reflector 206 has a generally cylindrical outer surface. This may allow for easy insertion of the retro-reflector 206 into a cylindrical recess of the movable arm 204. However, this design of the retro-reflector 206 is for illustration only. In other embodiments, the reflective faces 302 and the opening 304 can be formed in other ways, such as within a retro-reflector 206 having a square or rectangular outer surface.

Although FIGS. 3A and 3B illustrate one example of a retro-reflector 206 for use in an active partial-beam alignment system, various changes may be made to FIGS. 3A and 3B. For example, any other suitable reflector having any suitable number of reflective surfaces can be used to reflect a portion of an alignment beam 108 towards a first sensor 130 while allowing another portion of the alignment beam 108 to pass towards a second sensor 134.

Figure 4:
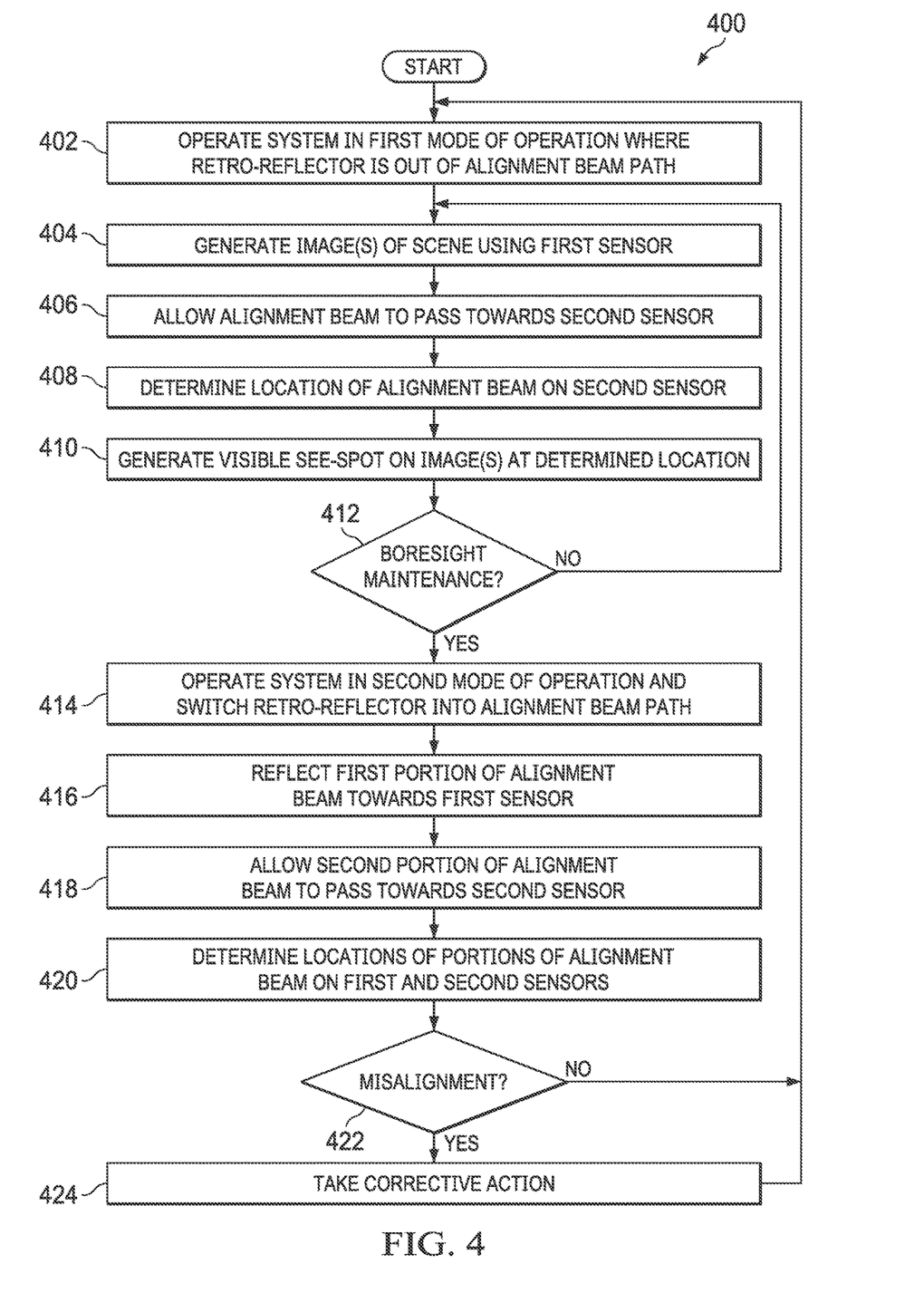
FIG. 4 illustrates an example method for using active partial-beam alignment for sensor-to-laser boresight maintenance in accordance with this disclosure.

FIG. 4 illustrates an example method 400 for using active partial-beam alignment for sensor-to-laser boresight maintenance in accordance with this disclosure. For ease of explanation, the method 400 shown in FIG. 4 is described as being used with the switchable retro-reflector assembly 132 shown in FIG. 2 containing the retro-reflector 206 shown in FIGS. 3A and 3B within the system 100 shown in FIG. 1. However, the method 400 can be used with any other suitable retro-reflector and switchable retro-reflector assembly and in any other suitable system.

As shown in FIG. 4, a system is operated in a first mode of operation where a retro-reflector is out of the optical path of an alignment beam at step 402. This can include, for example, the controller 138 causing the actuator 208 to rotate the movable arm 204 and move the retro-reflector 206 away from the aperture in the housing 202. During this mode, one or more images of a scene are generated using a first sensor at step 404. This can include, for example, the first sensor 130 receiving a signal 128 associated with a target 126 or other scene and the first sensor 130 or the controller 138 generating one or more still or video images based on measurements by the first sensor 130 of the signal 128. Also, during the first mode of operation, an alignment beam is allowed to pass towards a second sensor at step 406, and a location of the alignment beam on the second sensor is determined at step 408. This can include, for example, the second sensor 134 or the controller 138 using measurements of the alignment beam 108 captured by the second sensor 134 to identify the centroid, centroid track, or other location of the alignment beam 108. A visible see-spot can be generated within the one or more images at the determined location at step 410. This can include, for example, the controller 138 superimposing a visible see-spot onto the image or images being presented on the display 140. If boresight maintenance is not needed or desired at step 412, the process can return to step 404 to continue operation in the first mode. At some point, the high-energy laser 102 can be fired to direct the high-energy beam 104 towards the location that is (ideally) identified by the visible see-spot in the image or images.

If boresight maintenance is needed or desired at step 412, the system enters operation in a second mode of operation, and the retro-reflector is switched into the optical path of the alignment beam at step 414. This can include, for example, the controller 138 causing the actuator 208 to rotate the movable arm 204 and move the retro-reflector 206 in front of the aperture in the housing 202. During this mode, a first portion of the alignment beam is reflected towards the first sensor at step 416, and a second portion of the alignment beam is allowed to pass towards the second sensor at step 418. This can include, for example, the reflective faces 302 of the retro-reflector 206 reflecting the first portion of the alignment beam 108 towards the first sensor 130. This can also include the second portion of the retro-reflector 206 passing through the opening 304 of the retro-reflector 206 towards the second sensor 134.

Locations of the portions of the alignment beam on the first and second sensors are determined at step 420. This can include, for example, the first and second sensors 130 and 134 or the controller 138 using measurements of the alignment beam 108 captured by the sensors 130 and 134 to identify the centroids, centroid tracks, or other locations of the portions of the alignment beam 108. A determination is made whether there is misalignment between the sensed locations of the alignment beam at step 422. This can include, for example, the controller 138 determining whether the determined locations of the portions of the alignment beam 108 differ (such as by a threshold amount or a threshold percentage). If not, the process can return to step 402 to reenter the first mode of operation. Otherwise, one or more corrective actions can occur at step 424. This can include, for example, the controller 138 causing the visible see-spot within the one or more images to shift to a more appropriate location. This can also or alternatively include the controller 138 adjusting one or more fast steering mirrors 116 and 124, such as to adjust the aiming or direction of one or both of the beams 104 and 108. Any other or additional corrective action or actions can occur here, ideally allowing the accuracy of the visible see-spot to improve.

Although FIG. 4 illustrates one example of a method 400 for using active partial-beam alignment for sensor-to-laser boresight maintenance, various changes may be made to FIG. 4. For example, while shown as a series of steps, various steps in FIG. 4 can overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:
1. An apparatus comprising:
   a housing including an aperture configured to be positioned in an optical path of an alignment beam; and
   a reflector rotatably coupled to the housing and comprising one or more reflective faces and an opening, the reflector selectively movable into and out of the optical path of the alignment beam, wherein the opening comprises a triangular opening;

wherein, when the reflector is located within the optical path of the alignment beam, (i) the one or more reflective faces are configured to reflect a first portion of the alignment beam away from the aperture and (ii) the opening is configured to allow passage of a second portion of the alignment beam through the reflector and through the aperture.

2. The apparatus of claim 1, further comprising:
an actuator configured to move the reflector into and out of the optical path of the alignment beam; and
a movable arm coupled to the reflector;
wherein the actuator is configured to cause movement of the movable arm in order to move the reflector into and out of the optical path of the alignment beam.

3. The apparatus of claim 2, further comprising:
a linkage coupling the actuator and the movable arm.

4. The apparatus of claim 2, wherein:
the actuator comprises a linear actuator; and
the movable arm comprises a rotatable arm.

5. The apparatus of claim 2, wherein the actuator is mounted to the housing; and
wherein the movable arm comprises a rotatable arm pivotally coupled to the housing.

6. The apparatus of claim 1, wherein:
the reflector comprises a retro-reflector;
the retro-reflector comprises multiple reflective faces; and
the multiple reflective faces are positioned around the opening.

7. The apparatus of claim 6, wherein the retro-reflector comprises three reflective faces.

8. The apparatus of claim 1, wherein the reflector is physically movable between a first position and a second position such that:
the reflector in the first position is physically located in the optical path of the alignment beam; and
the reflector in the second position is physically located out of the optical path of the alignment beam.

9. A system comprising:
a first sensor configured to capture measurements associated with a scene;
a second sensor configured to capture measurements associated with an alignment beam; and
an assembly comprising a reflector, the reflector comprising one or more reflective faces and an opening, the reflector selectively movable into and out of an optical path of the alignment beam;
wherein, when the reflector is located out of the optical path of the alignment beam, the second sensor is configured to receive the alignment beam; and
wherein, when the reflector is located within the optical path of the alignment beam, (i) the one or more reflective faces are configured to reflect a first portion of the alignment beam towards the first sensor and (ii) the opening is configured to allow passage of a second portion of the alignment beam through the reflector towards the second sensor.

10. The system of claim 9, further comprising:
a controller configured to present one or more images of the scene on a display based on the measurements captured by the first sensor;
wherein the controller is also configured to present a visible see-spot within the one or more images of the scene, a location of the visible see-spot based on the measurements captured by the second sensor.

11. The system of claim 9, further comprising:
a controller configured to compare a location of the first portion of the alignment beam on the first sensor and a location of the second portion of the alignment beam on the second sensor.

12. The system of claim 11, wherein the controller is further configured to:
determine the location of the first portion of the alignment beam on the first sensor based on the measurements captured by the first sensor; and
determine the location of the second portion of the alignment beam on the second sensor based on the measurements captured by the second sensor.

13. The system of claim 11, wherein the controller is further configured to:
identify a difference between the locations of the portions of the alignment beam on the sensors; and
initiate a corrective action in response to the identified difference.

14. The system of claim 13, wherein the corrective action comprises at least one of:
adjusting a location of a visible see-spot presented within one or more images of the scene; and
controlling a fast steering mirror to alter a path of the alignment beam.

15. The system of claim 9, further comprising:
a first beam splitter configured to reflect the alignment beam and a high-energy laser beam; and
a second beam splitter configured to:
reflect the high-energy laser beam towards the scene;
reflect a signal from the scene towards the first sensor; and
transmit the alignment beam towards the second sensor;
wherein the first beam splitter is also configured to transmit the signal from the scene towards the first sensor.

16. The system of claim 9, wherein:
the assembly further comprises:
an actuator configured to move the reflector into and out of the optical path of the alignment beam; and
a movable arm coupled to the reflector; and
the actuator is configured to cause movement of the movable arm in order to move the reflector into and out of the optical path of the alignment beam.

17. The system of claim 16, wherein:
the assembly further comprises a housing;
the actuator is mounted to the housing; and
the movable arm comprises a rotatable arm pivotally coupled to the housing.

18. The system of claim 9, wherein:
the reflector comprises a retro-reflector;
the retro-reflector comprises multiple reflective faces; and
the multiple reflective faces are positioned around the opening.

19. A method comprising:
operating a laser system in a first mode of operation in which a reflector is selectively moved out of an optical path of an alignment beam, the reflector comprising one or more reflective faces and an opening;
in the first mode of operation, (i) using a first sensor to capture measurements associated with a scene and (ii) using a second sensor to capture measurements associated with the alignment beam;
operating the laser system in a second mode of operation in which the reflector is selectively moved into the optical path of the alignment beam; and in the second mode of operation, (i) using the one or more reflective faces to reflect a first portion of the alignment beam towards the first sensor and (ii) allowing passage of a second portion of the alignment beam through the opening of the reflector towards the second sensor.

20. The method of claim 19, further comprising:
generating one or more images of the scene; and
presenting a visible see-spot in the one or more images of the scene, a location of the visible see-spot based on the measurements of the alignment beam captured by the second sensor.

21. The method of claim 19, further comprising, in the second mode of operation:
determining a location of the first portion of the alignment beam on the first sensor;
determining a location of the second portion of the alignment beam on the second sensor;
identifying a difference between the locations of the portions of the alignment beam on the sensors; and
initiating a corrective action in response to the identified difference.

* * * * *